(No Model.)

S. F. LENOIR.
CAR COUPLING.

No. 488,792. Patented Dec. 27, 1892.

Witnesses:
Percy C. Bowen
John C. Wilson

Inventor:
Samuel F. Lenoir
By Whitman & Wilkinson,
Attorneys.

UNITED STATES PATENT OFFICE.

SAMUEL F. LENOIR, OF SUMTER, SOUTH CAROLINA.

CAR-COUPLING.

SPECIFICATION forming part of Letters Patent No. 488,792, dated December 27, 1892.

Application filed June 18, 1892. Serial No. 437,136. (No model.)

*To all whom it may concern:*

Be it known that I, SAMUEL F. LENOIR, a citizen of the United States, residing at Sumter, in the county of Sumter and State of South Carolina, have invented certain new and useful Improvements in Link-and-Pin Car-Couplings; and I do hereby declare the following to be a full, clear, and exact description of the invention, such as will enable others skilled in the art to which it appertains to make and use the same.

My invention relates to car-couplings, and especially to link and pin car couplings; and its nature will be understood by reference to the accompanying drawings, wherein the same parts are indicated by the same letters in all the figures.

Figure 1:
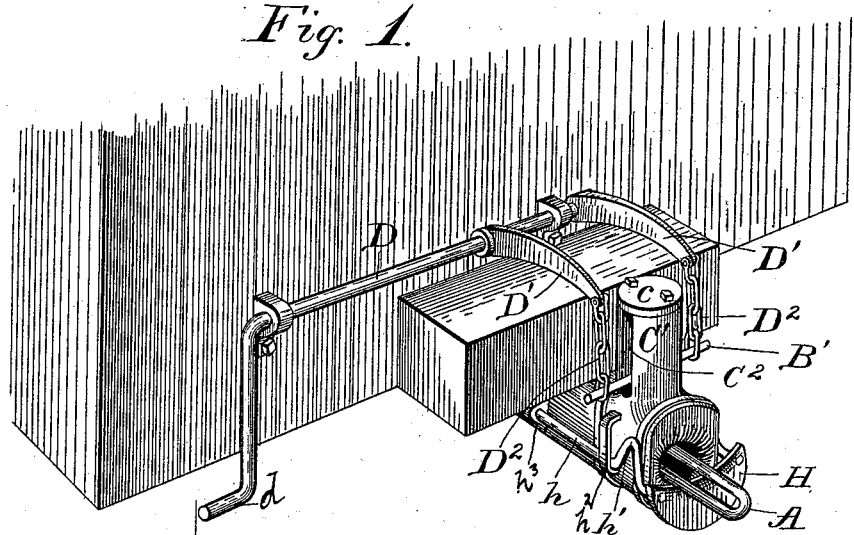
Figure 2:
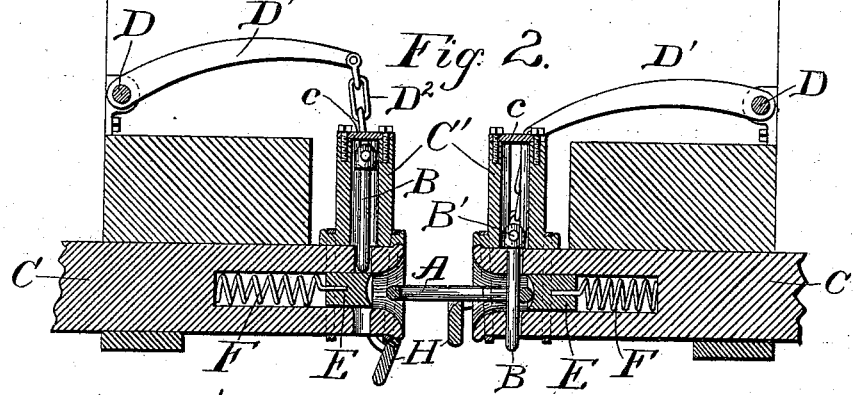
Figures 3, 4:
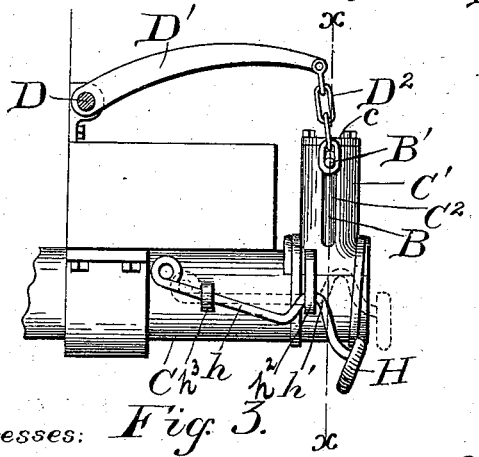

Figure 1 represents a perspective view of one end of a car fitted with one of my improved couplers. Fig. 2 represents a longitudinal section through two couplers, the one to the right carrying the link being about to engage the one to the left, as in coupling two cars together. Fig. 3 represents a side view of one of the improved couplers, and Fig. 4 represents a section of Fig. 3 along the line $xx$.

A represents the link, made of the usual form.

B represents the coupling pin having a cross piece B' attached to the head thereof. This cross piece moves in slots $C^2$ in the guide piece C', attached to the draw bar C. This guide piece C' has a removable cap $c$ which prevents the coupling pin from being drawn out entirely, and also keeps out snow, ice, cinders, &c. The coupling pin may be lifted by means of the handle $d$ attached to the lifting bar D, which carries the arms D' to which the chains $D^2$ are attached, or by any other suitable means. When lifted the bottom of the pin rests on the block E normally pressed forward by the spring F, (see Fig. 2, left coupler.) When the cars come together the link A pushes back this block E and the coupling pin falls into place. In order that the link A may be centered in the opposite drawhead, I provide a support H, having two side bars $h$, curved upward at $h'$ as shown, and passing through two guides $h^2$ and $h^3$ on either side of the draw-bar. When in the position shown in Fig. 1, these side bars hold the support H close under the link which is thus held nearly horizontal; and in the proper position for coupling. When the two cars come together the support H is pressed back, the bars $h$ slide in their guides, and when the curved portion $h'$ reaches its guide, the support H falls down out of the way as shown in Fig. 3.

Having thus described my invention, what I claim, and desire to secure by Letters-Patent of the United States, is—

1. In a link and pin car coupling, the combination with a hollow drawhead having the usual holes therein for the pin, and a guide frame C mounted thereon and having a movable cap $c$ and open slots $C^2$; of a pin B having a cross piece B' attached to the upper end thereof, the ends of which pass through the said open slots; chains $D^2$ attached to the ends of this cross bar, and a lifting bar D having handle $d$ and two arms D', the said arms being attached to the said chains; a block fitting in said drawhead; and a spring pressing forward said block and adapted to force the same beneath the pin when the said pin is raised and to be forced back by the link from the adjoining car, substantially as and for the purposes described.

2. In a link and pin car coupling, the combination with a hollow drawhead having the usual holes therein for the pin, and a guide frame C mounted thereon and having a removable cap $c$ and open slots $C^2$; of a pin B having a cross piece B' attached to the upper end thereof, the ends of which pass through the said open slots; a lifting device attached to said cross piece, a block fitting in said drawhead; and a spring pressing forward said block and adapted to force the same beneath the pin when the said pin is raised and to be forced back by the link from the adjoining car, and a centering device for the link consisting of the lune-shaped support H, the sliding bars $h$ bent at $h'$, and the guides $h^2$ and $h^3$, operating substantially as and for the purposes described.

In testimony whereof I affix my signature in presence of two witnesses.

SAMUEL F. LENOIR.

Witnesses:
E. SCOTT CARSON,
N. P. LENOIR.